United States Patent
Mensi et al.

(10) Patent No.: US 7,317,347 B2
(45) Date of Patent: Jan. 8, 2008

(54) CHARGE PUMP CIRCUIT WITH REUSE OF ACCUMULATED ELECTRICAL CHARGE

(75) Inventors: Luca Mensi, Marcheno (IT); Anna Richelli, Brescia (IT); Luigi Colalongo, Bologna (IT); Zsolt Miklos Kovacs-Vajna, Concesio (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 0 days.

(21) Appl. No.: 11/261,397

(22) Filed: Oct. 28, 2005

(65) Prior Publication Data

US 2006/0109048 A1    May 25, 2006

Related U.S. Application Data

(63) Continuation-in-part of application No. 10/995,017, filed on Nov. 22, 2004, now Pat. No. 7,248,096.

(51) Int. Cl.
    *G05F 3/02* (2006.01)
(52) U.S. Cl. ............. 327/536; 363/59; 363/60
(58) Field of Classification Search ........... 327/536, 327/537; 363/59, 60
    See application file for complete search history.

(56) References Cited

U.S. PATENT DOCUMENTS

| | | | | |
|---|---|---|---|---|
| 5,644,534 A * | 7/1997 | Soejima | ............ | 365/185.23 |
| 6,278,315 B1 * | 8/2001 | Kim | ............ | 327/536 |
| 6,452,438 B1 * | 9/2002 | Li | ............ | 327/536 |
| 6,501,325 B1 * | 12/2002 | Meng | ............ | 327/536 |
| 6,677,806 B2 * | 1/2004 | Bloch | ............ | 327/536 |
| 6,914,791 B1 * | 7/2005 | Park et al. | ............ | 363/60 |
| 6,952,129 B2 * | 10/2005 | Lin et al. | ............ | 327/536 |
| 6,995,603 B2 * | 2/2006 | Chen et al. | ............ | 327/536 |
| 7,098,725 B2 * | 8/2006 | Lee | ............ | 327/536 |
| 7,123,077 B2 * | 10/2006 | Chiu et al. | ............ | 327/536 |
| 7,145,382 B2 * | 12/2006 | Ker et al. | ............ | 327/536 |
| 7,248,096 B2 * | 7/2007 | Mensi et al. | ............ | 327/536 |
| 2002/0130703 A1 * | 9/2002 | Tsai | ............ | 327/536 |
| 2004/0232974 A1 * | 11/2004 | Tobita | ............ | 327/536 |

* cited by examiner

*Primary Examiner*—Kenneth B. Wells
*Assistant Examiner*—Thomas J. Hiltunen
(74) *Attorney, Agent, or Firm*—Lisa K. Jorgenson; Stephen Bongini; Fleit Kain Gibbons Gutman Bongini & Bianco P.L.

(57) ABSTRACT

A two-phase charge pump is provided that is capable of being controlled by first and second clock signals that are out-of-phase and take alternatively a first value and a second value during consecutive phases. The charge pump includes a sequence of cascade-connected stages that each have a first section and a second section. Each section includes an input terminal and an output terminal, a capacitive element, and a controlled switch coupling the input terminal of the section with the output terminal of the section. The input terminals in each stage other than the first stage are cross-coupled with the output terminals in a preceding stage. The capacitive element has first and second terminals. The first terminals in the first and second sections receive the first and second clock signals, respectively, and the second terminal is coupled with the output terminal of the section. The controlled switch has a control terminal. In each stage, the control terminals are coupled to each other. The first section further includes a first control circuit coupling the control terminal with the output terminal of the first section during the first phase, and the second section further includes a second control circuit coupling the control terminal with the input terminal of the second section during the second phase.

20 Claims, 9 Drawing Sheets

CHARGE PUMP CIRCUIT WITH REUSE OF ACCUMULATED ELECTRICAL CHARGE

CROSS-REFERENCE TO RELATED APPLICATIONS

This application is a continuation-in-part of prior U.S. patent application Ser. No. 10/995,017, filed Nov. 22, 2004, now U.S. Pat. No. 7,248,096 the entire disclosure.

FIELD OF THE INVENTION

The present invention relates to charge pump circuits, and more specifically to a two-phase charge pump.

BACKGROUND OF THE INVENTION

A charge pump is a particular voltage booster circuit, which is used to generate a voltage higher than its power supply voltage. For example, charge pumps commonly find application in an integrated circuit including a non-volatile memory with floating-gate transistors. In this case, a high-voltage is needed to program and/or erase the memory. In order to avoid the need to provide an external power supply voltage of high value, the integrated circuit is designed to have one or more internal charge pumps for producing the high-voltage from the (lower) power supply voltage.

Operation of a charge pump is based on the continuous accumulation and transfer of electric charge in a sequence of pumping capacitors, which are connected through corresponding switching elements. Particularly, each pumping capacitor has a free terminal, which is controlled by a signal switching between a low-voltage and a high-voltage; the control signals of adjacent pumping capacitors are always anti-phase. In this way, when the control signal is at the low-voltage the pumping capacitor is charged by the previous pumping capacitor; when the control signal switches to the high-voltage, the accumulated charge is transferred to the next pumping capacitor.

A classic implementation of the charge pump in which the switching elements consist of diodes is described in John F. Dickson, "On-Chip High-voltage Generation in NMOS Integrated Circuits Using an Improved Voltage Multiplier Technique", IEEE Journal of Solid State Circuits, vol. 11, no. 2, pp. 374-378, June 1976, the entire disclosure of which is herein incorporated by reference. A drawback of this charge pump is the unavoidable loss in its output voltage due to the threshold voltage and to the conduction resistance of the diodes. This drawback is exacerbated as the number of stages of the charge pump increases, because each additional stage further decrements the output voltage.

Alternatively, the diodes are replaced with pass transistors. For example, each pass transistor can be an NMOS transistor having the drain terminal connected to an input of the stage and the source terminal connected to an output of the stage; the gate terminal of the pass transistor is controlled by a signal that maintains the gate to source voltage of the pass transistor higher than its threshold value as the source voltage increases due to the charge transfer process. A known solution for obtaining this result is to use a four-phase architecture, with two additional control signals dedicated to over driving the gate terminals of the pass transistors. This solution, however, requires a more complex circuit for the generation of the control signals.

A different solution with a two-phase architecture is based on the use of pass transistors of the low-voltage type, which exhibit a reduced threshold voltage. In this case, the output resistance of the charge pump (whose value influences the efficiency of the entire circuit) can be favorably reduced by increasing its operating frequency and using transistors with lower parasitic capacitances. Furthermore, it is possible to use smaller pumping capacitors, thus saving silicon area on the chip. However, it is necessary to introduce a dedicated circuit architecture that allows the utilization of low-voltage transistors (typically based on two cross-coupled branches). An example of such a charge pump is described in R. Pelliconi et al., "Power Efficient Charge Pump in Deep Submicron Standard CMOS Technology", IEEE Journal of Solid State Circuits, vol. 38, no. 6, June 2003, the entire disclosure of which is herein incorporated by reference. According to this document, in each stage the charge transfer occurs through the use of two pass transistors of opposite type at a time; as a result, the effects of their threshold voltages are canceled (being of opposite signs). However, the two pass transistors that are series connected in each stage double its conductive resistance.

Japanese Patent Laid-Open Publication No. 08-322241, the entire disclosure of which is herein incorporated by reference, illustrates a solution for solving the threshold voltage loss drawback (in a two-phase charge pump of the high-voltage type) using a dynamic system for biasing the pass transistors. Particularly, each pass transistor is a PMOS transistor having the source terminal connected to the input of the stage and the drain terminal connected to the output of the stage. The gate terminal of the pass transistor is selectively connected to the input of the preceding stage (to turn it on), or to the output of the stage (to turn it off). This solution, however, is not suitable for use with low-voltage transistors that withstand a gate to source voltage swing at most equal to the supply voltage. In the circuit architecture proposed by this solution, each pass transistor is driven by a gate to source voltage that is higher than the supply voltage (particularly, equal to twice the supply voltage).

SUMMARY OF THE INVENTION

In view of these drawbacks, it is an object of the present invention to overcome these drawbacks and to provide an improved two-phase charge pump circuit.

One embodiment of the present invention provides a charge pump that is suitable to be controlled by a first clock signal and a second clock signal having a period with a first phase and a second phase. The clock signals are out-of-phase and take alternatively a first value and a second value during each pair of consecutive phases. The charge pump includes a sequence of cascade-connected stages each one having a first section and a second section. Each section includes an input terminal and an output terminal (the input terminals in each stage different from a first stage of the sequence being cross-coupled with the output terminals in a preceding stage), a capacitive element having a first terminal and a second terminal (the first terminals in the first and second sections receiving the first and second clock signals, respectively, and the second terminal being coupled with the output terminal of the section), and a controlled switch for coupling the input terminal of the section with the output terminal of the section (the controlled switch having a control terminal). In each stage the control terminals are coupled to each other; the first section further includes first control circuit for coupling the control terminal with the output terminal of the first section during the first phase, and the second section further includes second control circuit for coupling the control terminal with the input terminal of the second section during the second phase.

In some embodiments, the control circuit in each first and second section includes a further controlled switch with a control terminal that is coupled to the input terminal or to the output terminal, respectively. Preferably, the charge pump includes a different output stage for coupling the output terminals of the last stage with a global output terminal of the charge pump.

In one embodiment, in each section the controlled switch is a pass transistor. Preferably, the pass transistor of each first section is of a first type, and the pass transistor of each second section is of a second type opposite to the first type. Preferably, each further controlled switch consists of a control transistor. Preferably, in each first section the control transistor is of the first type and in each second section the control transistor is of the second type. Preferably, each transistor is of the MOSFET type.

The characterizing features of the present invention are set forth in the appended claims. The present invention itself, however, as well as further features and advantages thereof will be best understood by reference to the following detailed description, given purely by way of a non-restrictive indication, to be read in conjunction with the accompanying drawings.

DETAILED DESCRIPTION OF PREFERRED EMBODIMENTS

Preferred embodiments of the present invention will be described in detail hereinbelow with reference to the attached drawings.

Figure 1:
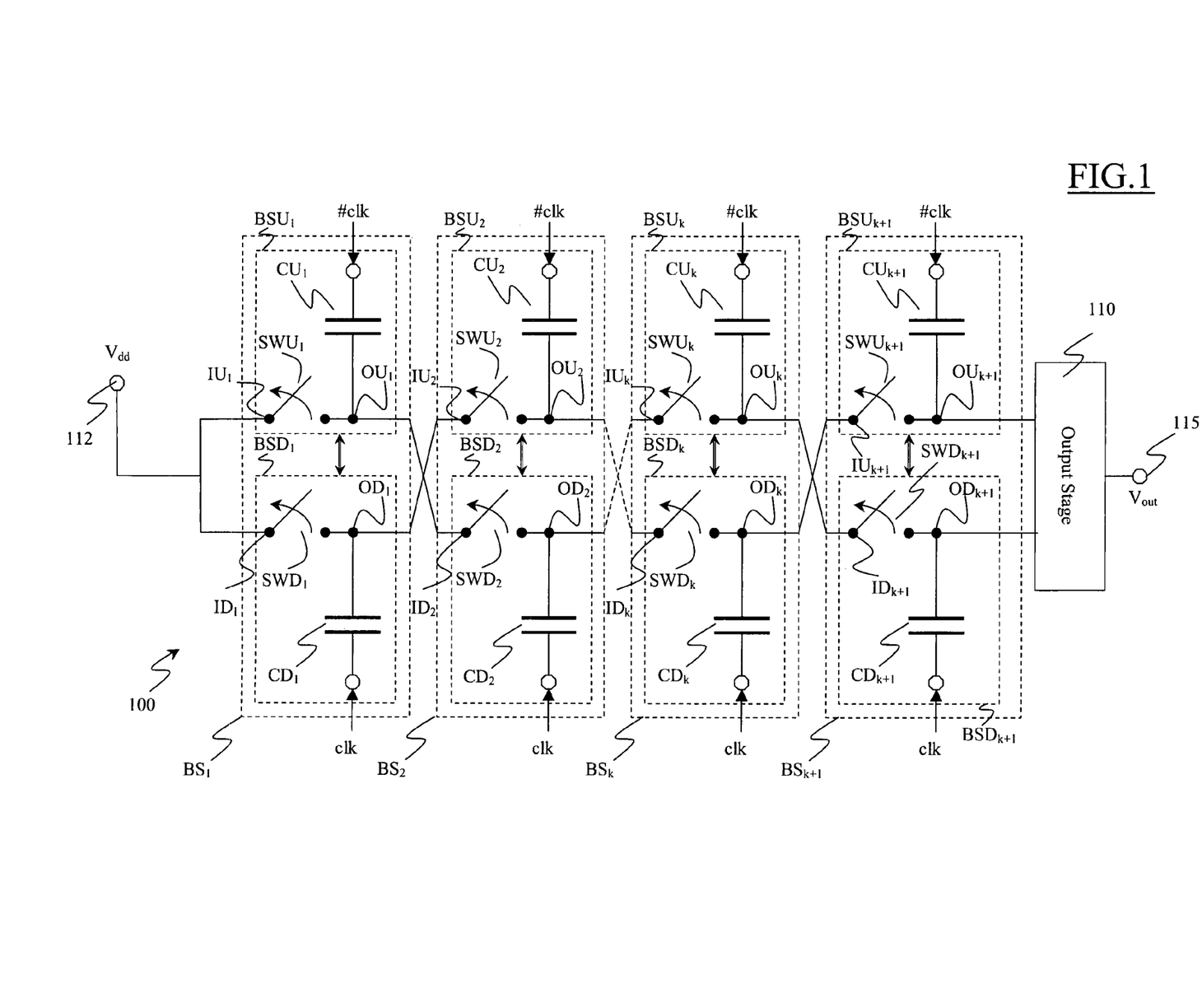
FIG. 1 is a circuit diagram of a low-voltage charge pump according to an embodiment of the present invention.

FIG. 1 is a simplified and generic circuit diagram of a low-voltage charge pump 100 according to an embodiment of the present invention. The charge pump 100 comprises a plurality of booster stages $BS_n$ (where n=1 to k+1) cross-connected in series. A last booster stage $BS_{k+1}$ is connected to an output stage 110. Each booster stage $BS_n$ includes an upper section $BSU_n$ (with an input terminal $IU_n$ and an output terminal $OU_n$) and a lower section $BSD_n$ (with an input terminal $ID_n$ and an output terminal $OD_n$). The input terminals $IU_1$ and $ID_1$ (of the first upper and lower sections $BSU_1$, $BSD_1$) define an input terminal 112 of the charge pump 100 that is connected to a terminal providing a power supply voltage $V_{dd}$ (for example, 1.2-3 V with respect to a reference voltage or ground). The output terminal $OU_n$ of a generic upper section $BSU_n$ (apart from the last upper section $BSU_{k+1}$) is connected in series with the input terminal $ID_{n+1}$ of the lower section $BSD_{n+1}$ of the next booster stage $BS_{n+1}$, while the output terminal $OD_n$ of a generic lower section $BSD_n$ (apart from the last lower section $BSD_{k+1}$) is connected in series with the input terminal $IU_{n+1}$ of the upper section $BSU_{n+1}$ of the next booster stage $BS_{n+1}$. The output terminals $OU_{k+1}$ and $OD_{k+1}$ of the last sections $BSU_{k+1}$ and $BSD_{k+1}$ are both connected to the output stage 110. The output stage 110 is in turn connected to an output terminal 115 of the charge pump 100, which provides an output voltage $V_{out}$.

Each section $BSU_n$, $BSD_n$ comprises a controlled switch ($SWU_n$ and $SWD_n$, respectively) and a pumping capacitor ($CU_n$ and $CD_n$, respectively). Considering the generic upper section $BSU_n$, a first terminal of the pumping capacitor $CU_n$ receives a clock signal #clk, while a second terminal of the pumping capacitor $CU_n$ is connected to the output terminal $OU_n$. Considering instead the generic lower section $BSD_n$, a first terminal of the pumping capacitor $CD_n$ receives a clock signal clk, while a second terminal of the pumping capacitor $CD_n$ is connected to the output terminal $OD_n$. Each controlled switch $SWU_n$, $SWD_n$ is connected between the corresponding input terminal $IU_n$, $ID_n$ and output terminal $OU_n$, $OD_n$.

Moreover, the upper section $BSU_n$ and the lower section $BSD_n$ of a generic booster stage $BS_n$ are connected to each other for the correct biasing of their controlled switches $SWU_n$, $SWD_n$, as it will be more clear in the following.

Figure 2:
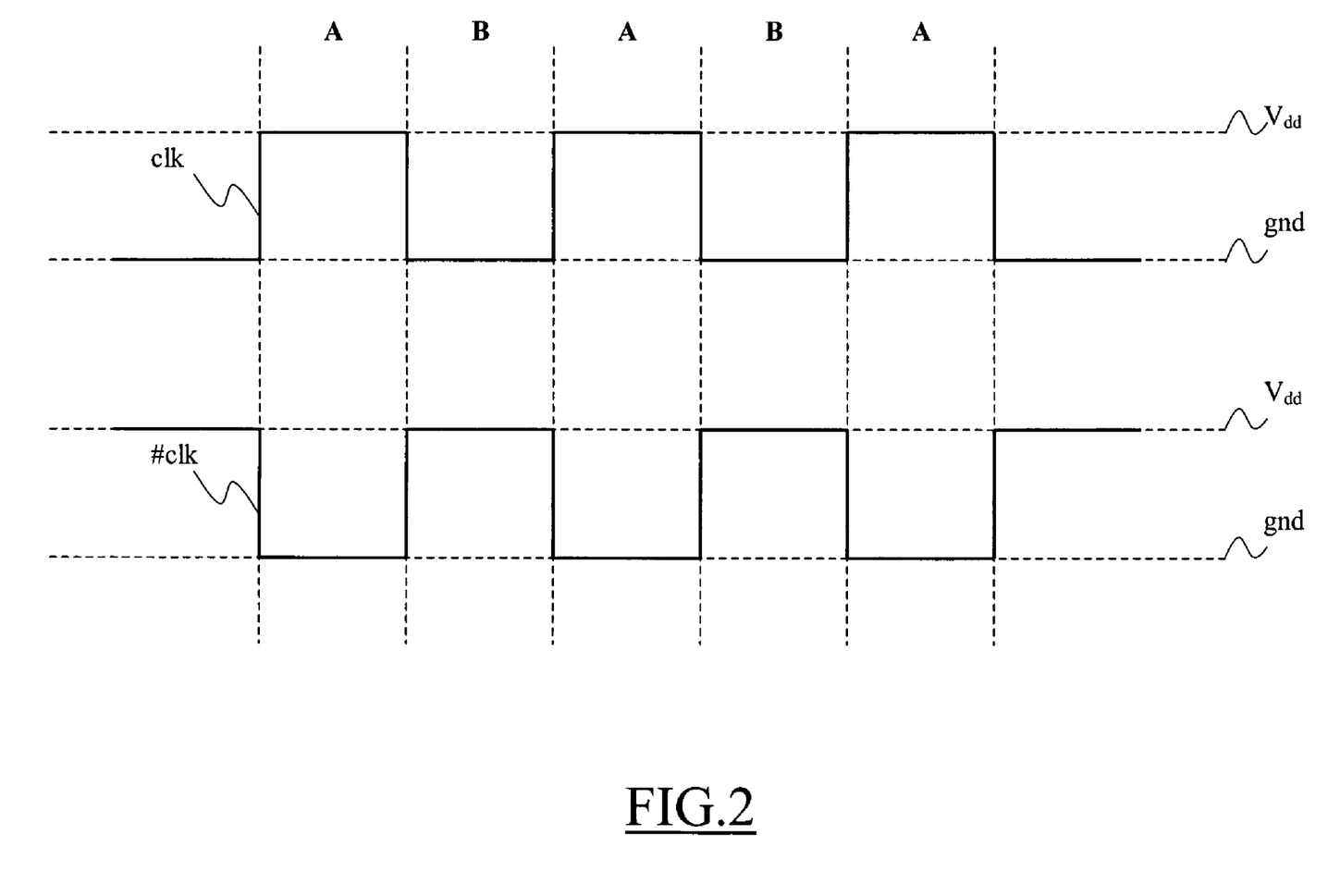
FIG. 2 is a diagram showing the waveforms of the clock signals controlling the charge pump shown in FIG. 1.

Considering now FIG. 2 together with FIG. 1, the clock signals clk and #clk alternately take a value equal to the voltage $V_{dd}$ or to the ground voltage; the clock signals clk and #clk always provide mutually complementary values. Particularly, the operation of each booster stage $BS_n$ is described below with reference to two temporal semi-periods A and B of the clock signals clk and #clk. In the semi-period A, the clock signal #clk provides the ground voltage and the clock signal clk provides the voltage $V_{dd}$. In the semi-period B, the clock signal #clk provides the voltage $V_{dd}$ and the clock signal clk provides the ground voltage.

During the semi-period A, the controlled switches $SWU_n$ in the upper sections $BSU_n$ are closed, and the controlled switches $SWD_n$ in the lower sections $BSD_n$ are open. During the semi-period B, the controlled switches $SWU_n$ in the upper sections $BSU_n$ are open, and the controlled switches $SWD_n$ in the lower sections $BSD_n$ are closed.

As a consequence, during the semi-period A, the pumping capacitor $CU_n$ of a generic upper section $BSU_n$ is charged by the lower section $BSD_{n-1}$ of its previous booster stage $BS_{n-1}$ (with the pumping capacitor $CU_1$ of the first upper section $BSU_1$ that is charged by the power supply directly).

During the semi-period B, instead, the output terminal $OU_n$ of each upper section $BSU_n$ goes to the voltage $V_{dd}$ plus the voltage at the pumping capacitor $CU_n$ (with the electric charge accumulated in the pumping capacitor $CU_n$ that is transferred to the next lower section $BSD_{n+1}$).

In the same way, during the semi-period B, the pumping capacitor $CD_n$ of a generic lower section $BSD_n$ is charged by the upper section $BSU_{n-1}$ of its previous booster stage $BS_{n-1}$ (with the pumping capacitor $CD_1$ of the first lower section $BSD_1$ that is charged by the power supply directly).

During the semi-period A, instead, the output terminal $OD_n$ of each lower section $BSD_n$ goes to the voltage $V_{dd}$ plus the voltage at the pumping capacitor $CD_n$ (with the electric charge accumulated in the pumping capacitor $CD_n$ that is transferred to the next upper section $BSU_{n+1}$).

Therefore, during the semi-period A the output terminal $OU_1$ is brought to a voltage $V_{dd}$, the output terminal $OU_2$ is brought to a voltage $2*V_{dd}$, and so on until the output terminal $OU_{k+1}$, that is brought to a voltage $(k+1)*V_{dd}$; moreover, the output terminal $OD_1$ is brought to a voltage $2*(Vdd)$, the output terminal $OD_2$ is brought to a voltage $3*V_{dd}$, and so on until the output terminal $OD_{k+1}$, that is brought to a voltage $(k+2)*V_{dd}$. In the same way, during the semi-period B the output terminal $OU_1$ is brought to a voltage $2*V_{dd}$, the output terminal $OU_2$ is brought to a voltage $3*V_{dd}$, and so on until the output terminal $OU_{k+1}$, that is brought to a voltage $(k+2)*V_{dd}$; moreover, the output terminal $OD_1$ is brought to a voltage $V_{dd}$, the output terminal $OD_2$ is brought to a voltage $2*V_{dd}$, and so on until the output terminal $OD_{k+1}$, that is brought to a voltage $(k+1)*V_{dd}$.

Each pair of corresponding sections $BSU_n$ and $BSD_n$ of a booster stage $BS_n$ (except $BSU_1$ and $BSD_1$) is identically configured. Hence, the configuration and operation thereof are described below with reference to FIG. 3 for the nth (numbered n) booster stage $BS_n$ as typical of each other booster stage.

Figure 3:
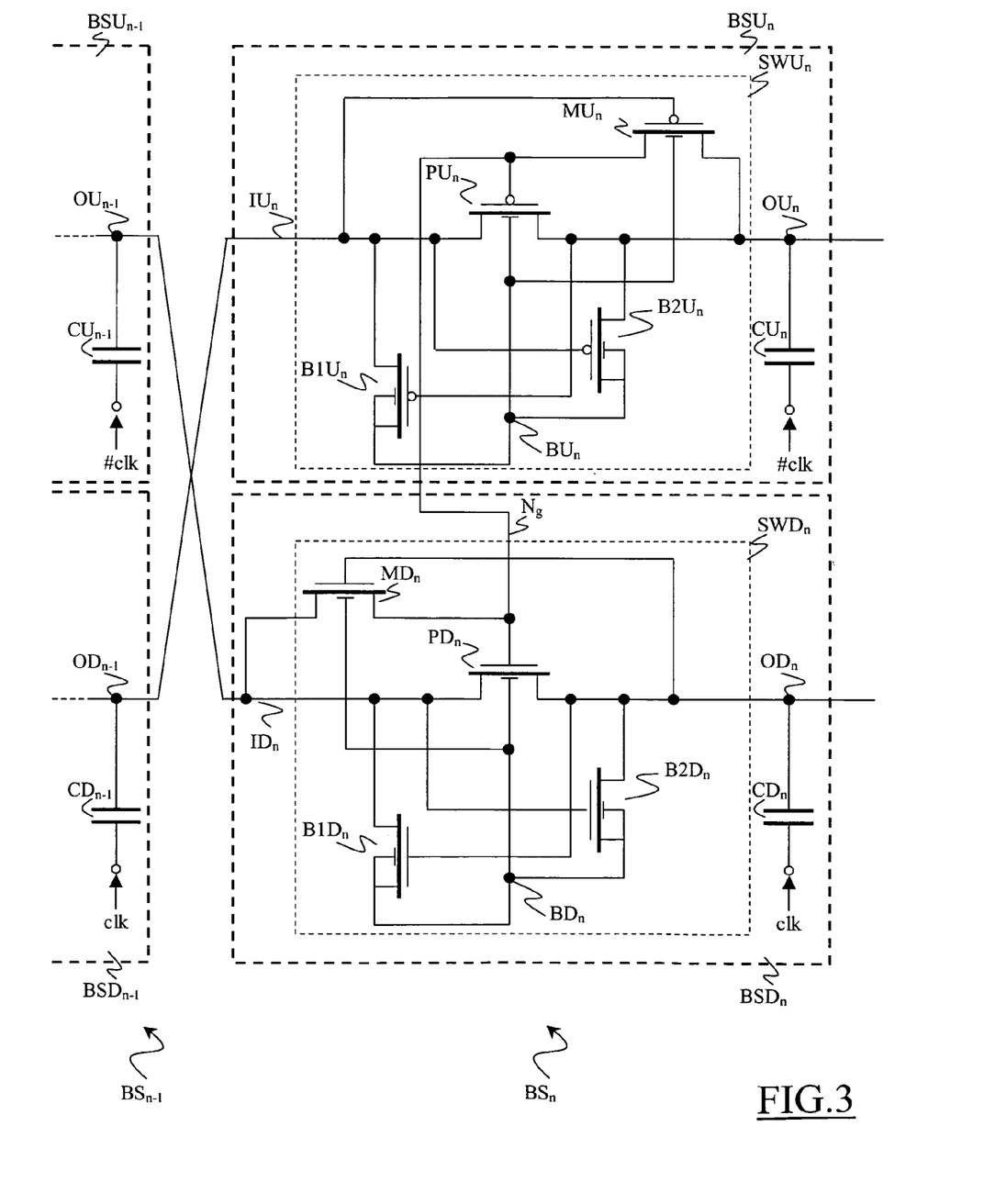
FIG. 3 is a diagram of the architecture of a generic booster stage belonging to the charge pump illustrated in FIG. 1 according to an embodiment of the present invention.

The controlled switch $SWU_n$ includes an upper PMOS pass transistor $PU_n$ for the controlled connection between the (upper) input terminal $IU_n$ and the (upper) output terminal $OU_n$ of the upper section $BSU_n$. The controlled switch $SWD_n$ includes a lower NMOS pass transistor $PD_n$ for the controlled connection between the (lower) input $ID_n$ and the (lower) output terminal $OU_n$ of the lower section $BSD_n$.

Particularly, the upper pass transistor $PU_n$ has the drain terminal connected to the upper input terminal $IU_n$, the source terminal connected to the upper output terminal $OU_n$, and the body terminal connected to a common-body terminal $BU_n$. The gate terminal of the upper pass transistor $PU_n$ is connected to the gate terminal of the lower pass transistor $PD_n$ (node $N_g$); at the same time, the gate terminal of the upper pass transistor $PU_n$ is also connected to the drain terminal of a PMOS transistor $MU_n$, whose purpose is to control the opening of the upper pass transistor $PU_n$, as it will be more clear in the following. The transistor $MU_n$ has the source terminal connected to the upper output terminal $OU_n$, the body terminal connected to the common-body terminal $BU_n$, and the gate terminal connected to the upper input terminal $IU_n$. The controlled switch $SWU_n$ further includes two PMOS transistors $B1U_n$ and $B2U_n$, whose purpose is to bias the body terminal $BU_n$ of the upper pass transistor $PU_n$ correctly. The transistor $B1U_n$ has the source terminal connected to the upper input terminal $IU_n$, the drain terminal and the body terminal connected to the common-body terminal $BU_n$, and the gate terminal connected to the upper output terminal $OU_n$. The transistor $B2U_n$ has the source terminal connected to the upper output terminal $OU_n$, the drain terminal and the body terminal connected to the common-body terminal $B_n$, and the gate terminal connected to the upper input terminal $IU_n$.

The lower pass transistor $PD_n$ has the source terminal connected to the lower input terminal $ID_n$, the drain terminal connected to the lower output terminal $OD_n$, and the body terminal connected to a common-body terminal $BD_n$. The gate terminal of the lower pass transistor $PD_n$ is connected (in addition to the gate terminal of the upper pass transistor $PU_n$) to the drain terminal of an NMOS transistor $MD_n$, whose purpose is to control the opening of the lower pass transistor $PD_n$, as it will be more clear in the following. The transistor $MD_n$ has the source terminal connected to the lower input terminal $ID_n$, the body terminal connected to the common-body terminal $BD_n$, and the gate terminal connected to the lower output terminal $OD_n$. The controlled switch $SWD_n$ further includes two NMOS transistors $B1D_n$ and $B2D_n$, whose purpose is to bias the body terminal $BD_n$ of the lower pass transistor $PD_n$ correctly. The transistor $B1D_n$ has the source terminal connected to the lower input terminal $ID_n$, the drain terminal and the body terminal connected to the common-body terminal $BD_n$, and the gate terminal connected to the lower output terminal $OD_n$. The transistor $B2D_n$ has the source terminal connected to the lower output terminal $OD_n$, the drain terminal and the body terminal connected to the common-body terminal $BD_n$, and the gate terminal connected to the lower input terminal $ID_n$.

The operation of the charge-pump 100 will be described in the following assuming that no load is connected to its output terminal (and thus no current is sunk).

Particularly, during the semi-period A, the clock signal clk switches to the voltage $V_{dd}$, so as to capacitively pull up the voltage of the lower output terminal $OD_n$ by $V_{dd}$. At the same time, the voltage of the lower input terminal $ID_n$ is pulled down by $V_{dd}$ by the clock signal #clk provided to the upper section $BSU_{n-1}$ of the previous booster stage $BS_{N-1}$ (that during semi-period A switches to the ground voltage). Conversely, the upper output terminal $OU_n$ is capacitively pulled down by the clock signal #clk, while the voltage of the upper input terminal $IU_n$ is pulled up by $V_{dd}$ by the clock signal clk provided to the lower section $BSD_{n-1}$ of the previous booster stage $BS_{n-1}$.

In this semi-period, the transistor $MD_n$ turns on because its gate to source voltage is brought to $V_{dd}$. Consequently, the gate and the source terminals of the lower pass transistor $PD_n$ are brought to the same voltage; in this way the lower pass transistor $PD_n$ turns off, and thus the charge transfer between pumping capacitors $CU_{n-1}$ and $CD_n$ is prevented (the pumping capacitor $CU_{n-1}$ is charged by the previous booster stage).

Conversely, in this semi-period the transistor $MU_n$ turns off, because its source to gate voltage is brought to zero. The gate voltage of the upper pass transistor $PU_n$ equals the gate voltage of the lower pass transistor $PD_n$, that is in turn brought to the voltage of the lower input terminal $ID_n$ by the transistor $MD_n$. In this way, the upper pass transistor $PU_n$ turns on (having the source to gate voltage equal to Vdd), and the charge transfer between pumping capacitors $CD_{n-1}$ and $CU_n$ is enabled.

At the same time, the transistor $B1D_n$ turns on, because its gate terminal has a voltage higher than the voltage of its source terminal. The transistor $B2D_n$ instead turns off, because its gate terminal has a voltage lower than the voltage of its source terminal. The transistor $B1D_n$ short-circuits the body terminal and the source terminal of the lower pass transistor $PD_n$, so as to avoid having its body terminal floating, and then preventing a body-effect (that is, an increasing of the threshold voltage of the pass transistors moving toward the output stage of the charge pump due to the voltage difference between the body terminal and the source terminal); this arrangement is explained in more detail in J. Shin et al., "A New Charge Pump Without Degradation in Threshold Voltage Due to Body Effect", IEEE Journal of Solid State Circuits, vol. 35, no. 8, August 2000, the entire disclosure of which is herein incorporated by reference. Still during the semi-period A, the transistor $B1U_n$ turns on, because its gate terminal has a voltage lower than the voltage of its source terminal. The transistor $B2U_n$ instead turns off, because its gate terminal has a voltage higher than the voltage of its source terminal. The transistor $B1U_n$ short-circuits the body terminal and the drain terminal of the upper pass transistor $PU_n$, so as to avoid having its body terminal floating.

During the semi-period B, the clock signal clk switches to the ground voltage, so as to capacitively pull down the voltage of the lower output terminal $OD_n$ by $V_{dd}$. At the same time, the voltage of the lower input terminal $ID_n$ is pulled up by $V_{dd}$ by the clock signal #clk provided to the upper section $BSU_{n-1}$ of the previous booster stage $BS_{n-1}$ (that during semi-period B switches to the voltage $V_{dd}$).

Conversely, the upper output terminal $OU_n$ is capacitively pulled up by the clock signal #clk, while the voltage of the upper input terminal $IU_n$ is pulled down by $V_{dd}$ by the clock signal clk provided to the lower section $BSD_{n-1}$ of the previous booster stage $BS_{n-1}$.

In this semi-period, the transistor $MU_n$ turns on because its source to gate voltage is brought to $V_{dd}$. Consequently, the gate and the source terminals of the upper pass transistor $PU_n$ are brought to the same voltage; in this way the upper pass transistor $PU_n$ turns off, and thus the charge transfer between pumping capacitors $CD_{n-1}$ and $CU_n$ is prevented (the pumping capacitor $CD_{n-1}$ is charged by the previous booster stage).

Conversely, in this semi-period the transistor $MD_n$ turns off, because its source to gate voltage is brought to zero. The gate voltage of the lower pass transistor $PD_n$ equals the gate voltage of the upper pass transistor $PU_n$, that is in turn brought to the voltage of the upper output terminal $OU_n$ by the transistor $MU_n$. In this way, the lower pass transistor $PD_n$ turns on (having the gate to source voltage equal to Vdd), and the charge transfer between pumping capacitors $CU_{n-1}$ and $CD_n$ is enabled.

At the same time, the transistor $B1D_n$ turns off, because its gate terminal has a voltage lower than the voltage of its source terminal. The transistor $B2D_n$ instead turns on, because its gate terminal has a voltage higher than the voltage of its source terminal. The transistor $B2D_n$ short-circuits the body terminal and the drain terminal of the lower pass transistor $PD_n$, so as to avoid having its body terminal floating. Still during the semi-period B, the transistor $B1U_n$ turns off, because its gate terminal has a voltage higher than the voltage of its source terminal. The transistor $B2U_n$ instead turns on, because its gate terminal has a voltage lower than the voltage of its source terminal. The transistor $B2U_n$ short-circuits the body terminal and the source terminal of the upper pass transistor $PU_n$, so as to avoid having its body terminal floating.

In short, the charge transfer occurs in the upper sections $BSU_n$ during the semi-periods A, and in the lower sections $BSD_n$ during the semi-periods B.

The configuration and operation of the sections $BSU_1$ and $BSD_1$ of the first booster stage $BS_1$ are similar to those previously described for a generic booster stage $BS_n$. The only difference is that the lower section $BSD_1$ includes a transistor $MD_1$ (corresponding to the transistor $MD_n$ of a generic lower section $BSD_n$) having the source terminal that receives the clock signal #clk directly.

Figure 4:
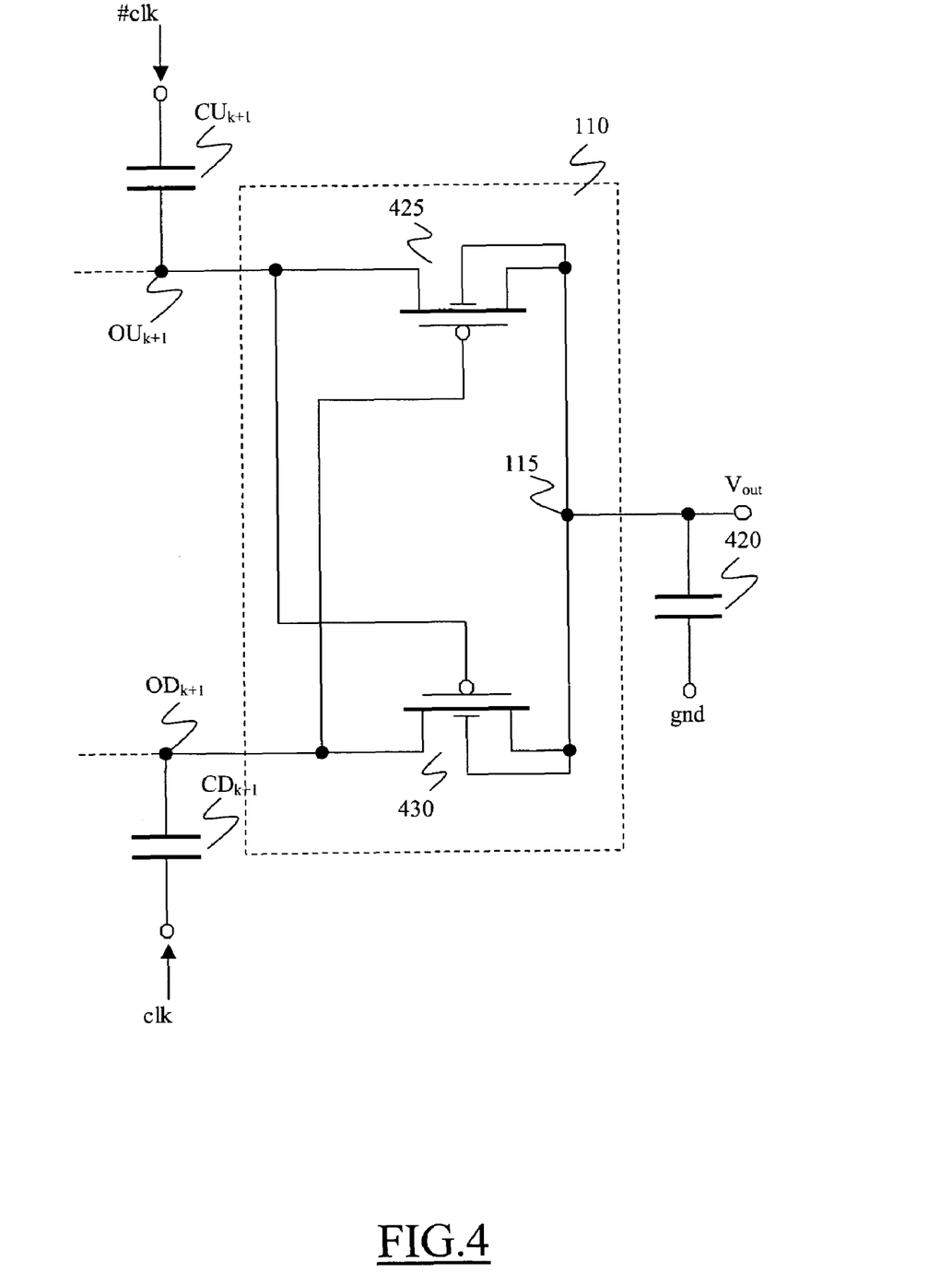
FIG. 4 is a diagram of the architecture of an output stage of the charge pump illustrated in FIG. 1 according to an embodiment of the present invention.

As shown in FIG. 4, the circuit structure of the output stage 110 (a non-boosting stage, i.e., without any pumping capacitor) is simpler than the structure of the other booster stages. The task of the output stage 110 is to transfer the boosted voltages generated by the upper and lower booster stages of the charge pump to the output terminal 115, which is connected to an output capacitor 420. Furthermore, the output stage 110 is realized in such a way that during the semi-period A the voltage $V_{out}$ at the output terminal 115 is the boosted voltage of the lower section $BSD_{k+1}$ of the last booster stage $BS_{k+1}$, and during the semi-period B the voltage $V_{out}$ at the output terminal 115 is the boosted voltage of the higher section $BSU_{k+1}$ of the last booster stage $BS_{k+1}$. To realize this function, a PMOS pass transistor 425 is connected between the output upper terminal $OU_{k+1}$ and the output terminal 115. The gate terminal of the pass transistor 425 is connected to the output lower terminal $OD_{k+1}$, in such a way that the pass transistor 425 turns on during the semi-period B. In the same way, a PMOS pass transistor 430 is connected between the output lower terminal $OD_{k+1}$ and the output terminal 115. The gate terminal of the pass transistor 430 is connected to the output upper terminal $OU_{k+1}$, in such a way that the pass transistor 430 turns on during the semi-period A.

In each booster stage $BS_n$, the voltages at the output terminals $OU_n$, $OD_n$ are higher than the corresponding voltages at the output terminals $OU_{n-1}$, $OD_{n-1}$ of the previous booster stage $BS_{n-1}$ by an amount $\Delta V$ equal to:

$$\Delta V = V_{dd}\left(\frac{C_n}{C_n + C_p}\right) - R_{out}I_{out}$$

where the parameter $C_n$ represents the capacitance of either the pumping capacitor $CD_n$ or the pumping capacitor $CU_n$, $C_p$ represents the whole parasitic capacitances of the output terminals $OU_n$, $OD_n$, $R_{out}$ represents the output resistance of each section of the booster stage $BS_n$ and $I_{out}$ represents the output current flowing toward the next booster stage $BS_{+1}$. As can be seen in the above equation, $\Delta V$, i.e., the voltage gain of a single booster stage $BS_n$, is not affected by the threshold voltages of the pass transistors $PU_n$, $PD_n$.

The output resistance $R_{out}$ is defined by the following equation.

$$R_{out} = \frac{1}{2f(C_n + C_p)} + R_{PUN,PDN},$$

where f is the frequency of the clock signals clk, #clk and $R_{PUN,PDN}$ is the conduction resistance of the pass transistors $PU_n$, $PD_n$. As can be seen in the above equation, the output resistance $R_{out}$ is inversely proportional to the frequency f of the clock signals.

The charge pump of this embodiment is suitable for "low-voltage" technology. In fact, the charge pump is structured in such a way that each transistor has a gate to source voltage at most equal to the voltage $V_{dd}$. In this way, it is possible to use pass transistors with lower threshold voltages and to operate at higher frequencies (than in the case of using high-voltage technology); consequently, it is possible to use pumping capacitors of smaller size, without worsening (i.e., increasing) the output resistance of the charge pump.

Moreover, in comparison with the conventional charge pump with low-voltage architecture presented above, the structure of this embodiment of the present invention suffers lower voltage losses due to the conduction resistance of the pass transistors. In fact, unlike the conventional charge pump, the charge transfer from a pumping capacitor to the next one occurs by a single pass transistor per each stage (and not by two series-connected ones); thus, the voltage loss due to conduction resistances is ideally halved.

A further advantage provided by the architecture of this embodiment of the present invention is the possibility of reusing the electric charge which is accumulated at the highly-capacitive gate terminals of the pass transistors $PU_n$, $PD_n$ of each booster stage $BS_n$.

Figure 5A:
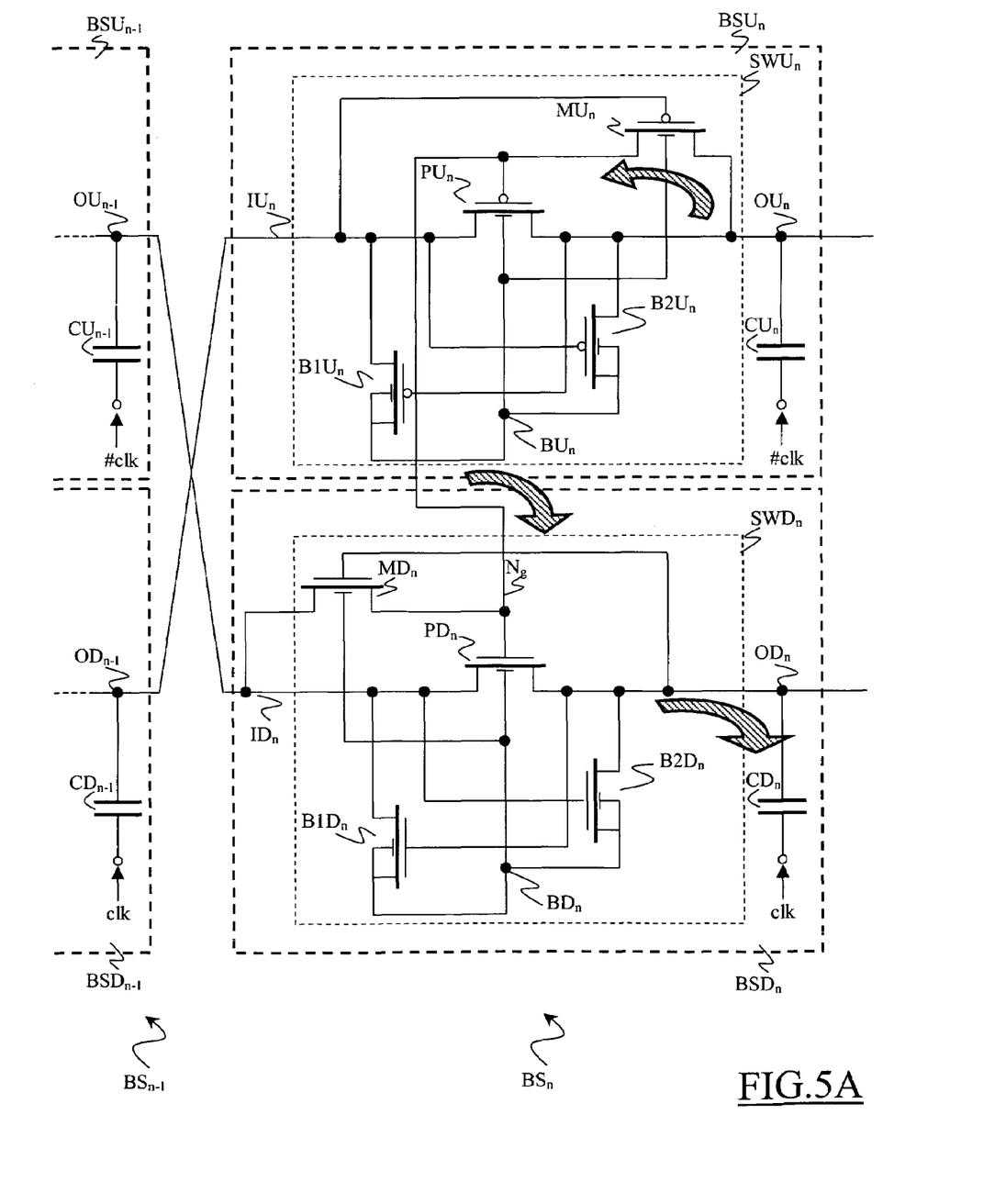
FIGS. 5A and 5B depict the flow of electrical charge in a generic booster stage during different operating phases.

More particularly, for the purpose of illustrating this effect, the current flows due to the drift of electric charge in the nth booster stage $BS_n$ are illustrated during the semi-period B in FIG. 5A. During the semi-period B, the charge transfer between the booster stage $BS_{n-1}$ and the booster stage $BS_n$ occurs from the pumping capacitor $CU_{n-1}$ to the pumping capacitor $CD_n$. In this semi-period, the upper pass transistor $PU_n$ is turned off, while the lower pass transistor $PD_n$ is turned on; moreover, the transistor $MU_n$ is turned on, while the transistor $MD_n$ is turned off. Consequently, there is a further flow of electrical charge, from the upper output terminal $OU_n$ to the gate terminals of the pass transistors $PU_n$ and $PU_d$. Since the gate terminals of the pass transistors $PU_n$ and $PU_d$ forms the highly-capacitive node Ng (the transistor $MD_n$ is turned off), the electrical charge provided by the upper output terminal $OU_n$ is stored in the latter terminal, which voltage increases.

Figure 5B:
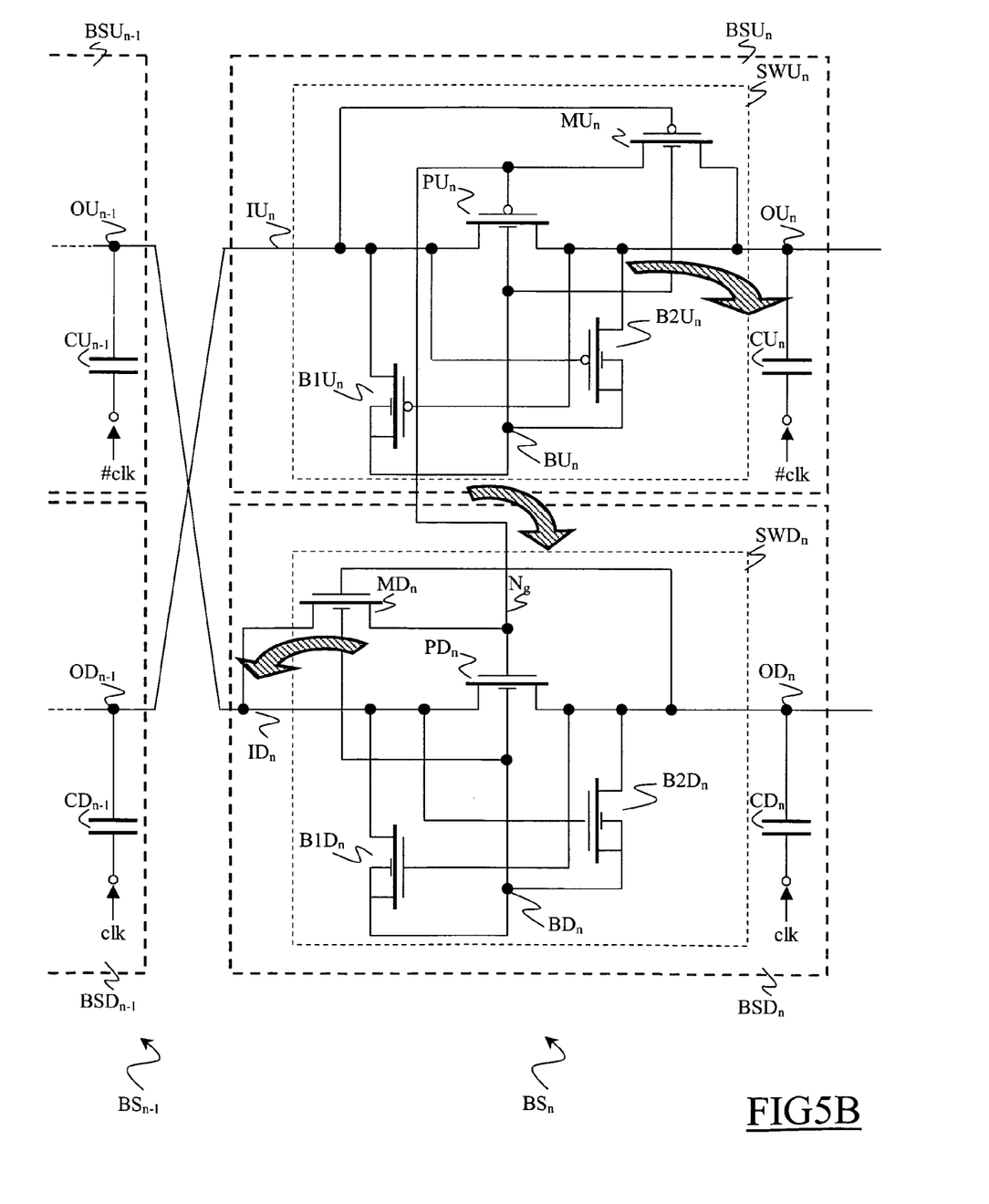

During the subsequent semi-period A, the situation is inverted. The charge transfer between the booster stage $BS_{n-1}$ and the booster stage $BS_n$ occurs now from the pumping capacitor $CD_{n-1}$ to the pumping capacitor $CU_n$, as illustrated in FIG. 5B. In this semi-period, the upper pass transistor $PU_n$ is turned on, while the lower pass transistor $PD_n$ is turned off; moreover, the transistor $MU_n$ is turned off, while the transistor $MD_n$ is turned on. In order to turn on the upper pass transistor $PU_n$ it is necessary that the voltage of the node Ng decreases. Consequently, the electrical charge previously stored in the node Ng during the semi-period B has to be removed therefrom. The only conductive path adapted to this purpose is provided by the transistor $MD_n$. In this way, a flow of electrical charge occurs from the node Ng to the lower input terminal $ID_n$, that is connected to the pumping capacitor $CU_{n-1}$. Since during the semi-period A the pumping capacitor $CU_{n-1}$ has to be charged by its previous booster stage $BS_{n-2}$, the flow of electrical charge due to the discharging of the node Ng helps the charging of the pumping capacitor $CU_{n-1}$, speeding up the operation of the charge pump 100.

Naturally, in order to satisfy local and specific requirements, one of ordinary skill in the art may apply to the embodiment described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the present invention may be incorporated in any other embodiment as a general matter of design choice.

Particularly, similar considerations apply if the charge pump has an equivalent structure or includes other elements (for example, if it is formed by a different number of booster stages or if it is supplied by a voltage having another value); in any case, nothing prevents the use of the present invention in a negative charge pump. Moreover, the use of equivalent components for controlling the gate terminals of the pass transistors is not excluded. Likewise, the output stage may be implemented with an equivalent structure. Similar considerations apply if the NMOS transistors are replaced with PMOS transistors, and vice versa; in any case, the use of bipolar transistors (or more generally any other controlled switches) is within the scope of the present invention.

Experimental Results

To evaluate the performance of an embodiment of the present invention, the charge pump has been simulated on a computer and analyzed at the following operating conditions: switching frequency f=100 MHz, duty cycle of 50% for each clock signal, supply voltage $V_{dd}$=1.1V and output current $I_{out}$=185 µA.

The charge pump has been dimensioned in such a way to ensure the maximization of its energy efficiency. The capacitance of the pumping capacitors heavily affects the power consumption, and thus the efficiency of the whole charge pump. Consequently, it is necessary to reduce the size of the pumping capacitors as far as possible. Considering a load connected to the output terminal, and thus in presence of an output current $I_{out}$, it has been demonstrated that the optimum capacitance $C_{opt}$ is given by the following.

$$C_{opt} = \frac{I_{out}}{fV_{dd}} = 2 \text{ pF}.$$

This value can easily be used in an integration process, and implies a substantial saving of silicon area.

The dimensioning of both the upper and lower pass transistors has to ensure a good charge transfer between the various booster stages. This is true when the time constant τ of each booster stage is about a fourth of the semi-period of the clock signals. A good result has been achieved with the following values.

$$\left(\frac{W}{L}\right)_{PUn} = 36$$

$$\left(\frac{W}{L}\right)_{PDn} = 12$$

The charge pump has been loaded by inserting a load circuit between the output terminal and a terminal providing the ground voltage. The load circuit is a resistive load having a variable resistance $R_L$ connected in parallel with a capacitive load having a capacitance $C_L$ of 2 pF (necessary for reducing the voltage ripple of the output voltage $V_{out}$).

Figure 6A:
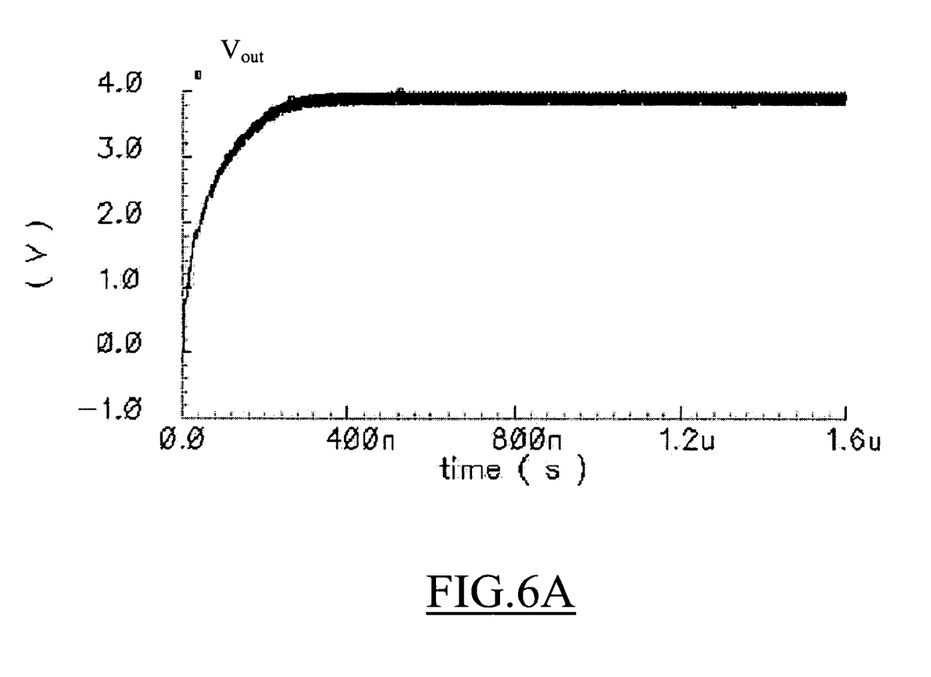
FIGS. 6A-6E are diagrams showing the results of computer simulations executed on the charge pump of FIG. 1.

In the case of a resistive load with $R_L$ equal to 20KΩ (FIG. 6A), the output voltage $V_{out}$ reaches a maximum steady condition voltage of 3.98 V, with a steady condition mean voltage of 3.9 V. Moreover, in this case, the output voltage $V_{out}$ has a voltage ripple of 175 mV, and a rising time trise equal to about 175 nsec.

Figure 6B:
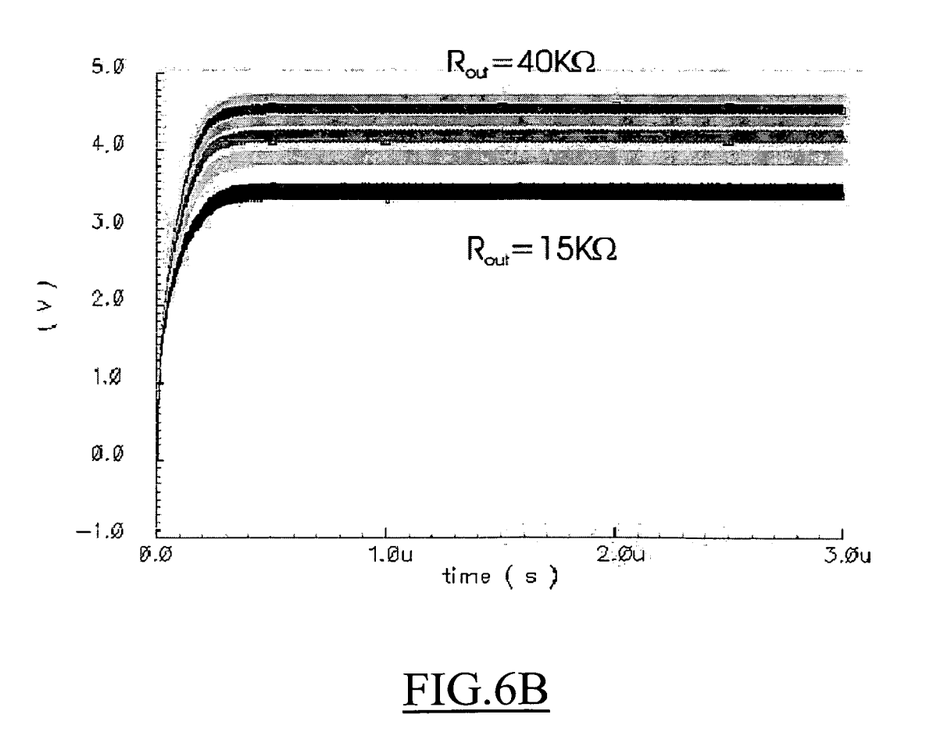

FIG. 6B is a diagram showing the output voltage $V_{out}$ of the proposed charge pump depending on time with different resistance values ($R_L$ from 15KΩ to 40 KΩ).

Figure 6C:
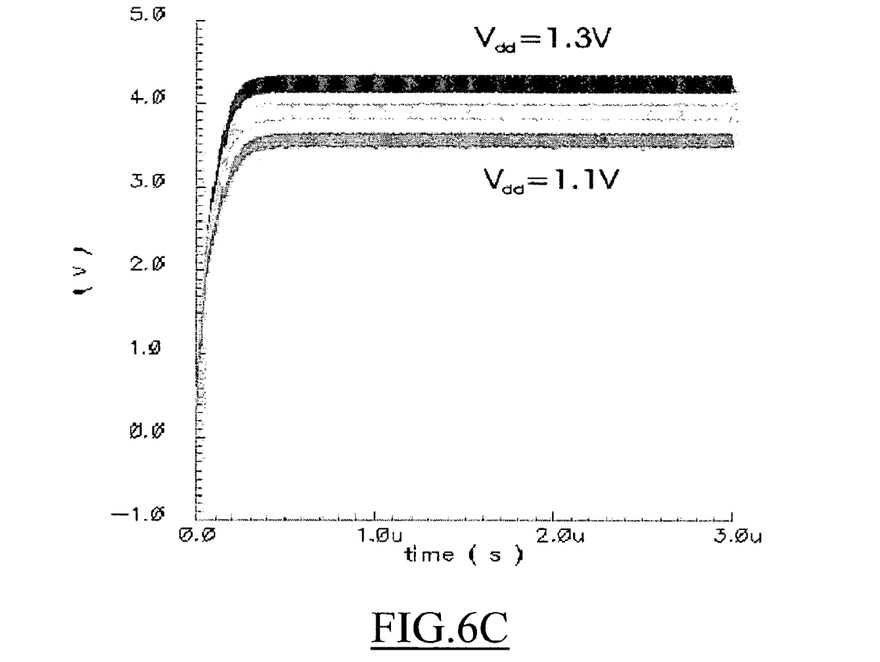

FIG. 6C is a is a diagram showing the output voltage $V_{out}$ depending on time at different supply voltages $V_{dd}$ ($V_{dd}$ from 1.1 V to 1.3 V).

A very important parameter characterizing a charge pump is the energetic efficiency η, defined by the following $$\eta = \frac{P_{out}}{P_{int}} * 100$$

where $P_{out}$ is the output power supplied to the load by the charge pump, while $P_{in}$ is the input power provided to the charge pump, that has to comprise the contributions of all the input signals necessary for operating the charge pump, namely, the supply voltage $V_{dd}$ and the clock signals clk and #clk. Consequently, the energetic efficiency η becomes equal to the following.

$$\eta = \frac{P_{out}}{P_{Vdd} + P_{clk} + P_{\#clk}} * 100$$

where $P_{Vdd}$ is the power provided by the supply voltage $V_{dd}$, $P_{clk}$ is the power provided by the clock signal clk and $P_{\#clk}$ is the power provided by the clock signal #clk (the powers are obtained as an average of the voltage-current products after a transient period).

Figure 6D:
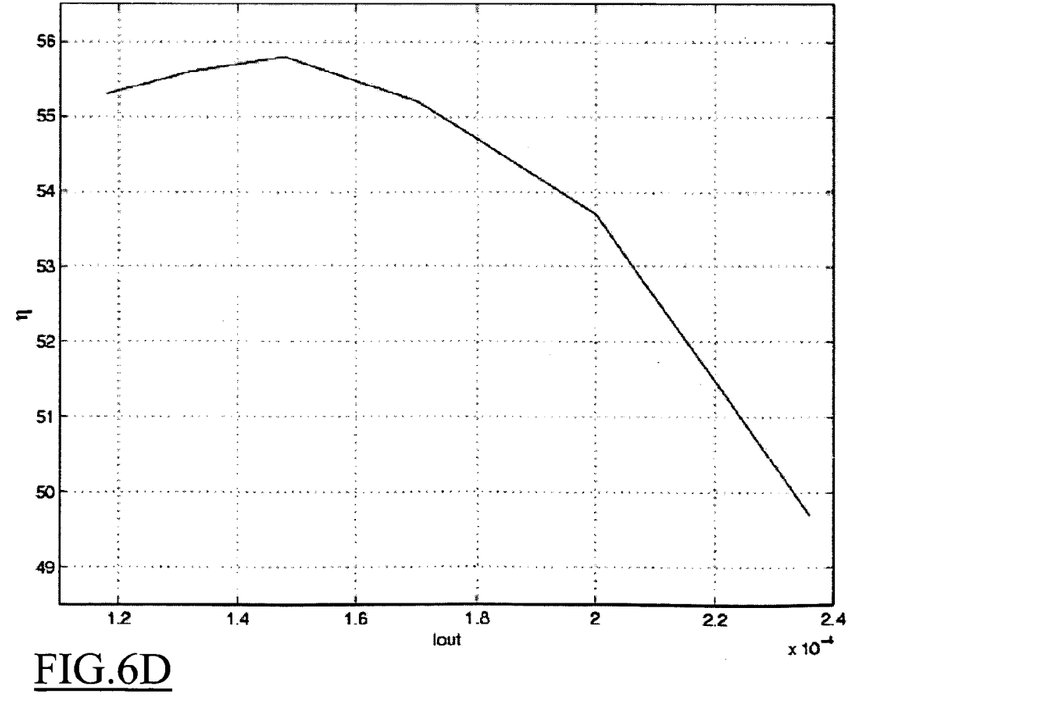

FIG. 6D is a diagram showing the energetic efficiency η of the proposed charge pump depending on the output current $I_{out}$ (and so, depending on the resistance $R_L$). The energetic efficiency η has an excellent value of about 55% with an output current $I_{out}$ equal to 200 μA.

The following table shows the results of the simulations relating to the proposed charge pump depending on the resistance $R_L$.

| 4 stages-charge pump | | | | | |
|---|---|---|---|---|---|
| $R_L$ | $V_{out}$ (max) | $I_{out}$ (max) | η | ripple | $t_{rise}$ |
| 15 KΩ | 3.55 V | 236 μA | 49.70% | 208 mV | 160.4 nsec |
| 20 KΩ | 3.98 V | 200 μA | 53.70% | 170 mV | 165.3 nsec |
| 25 KΩ | 4.26 V | 170 μA | 55.20% | 150 mV | 170 nsec |
| 30 KΩ | 4.46 V | 148 μA | 55.80% | 127 mV | 170.3 nsec |
| 35 KΩ | 4.62 V | 132 μA | 55.60% | 108 mV | 174.9 nsec |
| 40 KΩ | 4.74 V | 118 μA | 55.30% | 98 mV | 175 nsec |

From the results illustrated in this table, it can be shown that the output voltage $V_{out}$ is close to that provided by the theory. In fact, disregarding the parasitic capacitance of the intermediate terminals, the following results.

$$V_{out} = (k+1)V_{dd} - \frac{kI_{out}}{2fC}$$

(C represents the value of each pumping capacitance). In the case of four stages, and with $I_{out}$=185 μA, it results that $V_{out}$=4.15 V, close to the ideal result.

The proposed charge pump, without a connected load (that is, without output current), allows reaching an output voltage $V_{out}$ equal to 5.8V, a value that is close to the theoretical value of 6V obtainable with $V_{dd}$=1.2V (the difference is caused by the parasitic capacitance on the intermediate terminals).

Moreover, still from the results illustrated in the table above, it can be shown that the raising time $t_{rise}$ is always lower than 200 nsec.

For the purpose of better evaluating the reliability of the present invention, in the following there are illustrated the results of computer simulations obtained varying the number of booster stages included in the charge pump.

In particular, the following tables show the results of simulations relating to the proposed charge pump implemented with six, eight and ten booster stages, depending on the resistance $R_L$.

| 6 stages-charge pump | | | | |
|---|---|---|---|---|
| $R_L$ | $V_{out}$ (max) | $I_{out}$ (max) | η | $t_{rise}$ |
| 25 KΩ | 5.12 V | 205 μA | 49.21% | 355.6 nsec |
| 30 KΩ | 5.47 V | 182 μA | 52.92% | 359.9 nsec |
| 35 KΩ | 5.74 V | 164 μA | 54.09% | 359.8 nsec |
| 40 KΩ | 5.96 V | 149 μA | 54.98% | 359.8 nsec |
| 45 KΩ | 6.15 V | 137 μA | 55.52% | 360.4 nsec |
| 50 KΩ | 6.3 V | 126 μA | 55.73% | 364.6 nsec |
| 55 KΩ | 6.43 V | 117 μA | 55.62% | 364.8 nsec |
| 60 KΩ | 6.54 V | 109 μA | 55.27% | 365.4 nsec |

| 8 stages-charge pump | | | | |
|---|---|---|---|---|
| $R_L$ | $V_{out}$ (max) | $I_{out}$ (max) | η | $t_{rise}$ |
| 30 KΩ | 6.26 V | 208 μA | 48.36% | 619.3 nsec |
| 35 KΩ | 6.68 V | 190 μA | 52.88% | 619.7 nsec |
| 40 KΩ | 7 V | 175 μA | 54.11% | 623.1 nsec |
| 45 KΩ | 7.28 V | 161 μA | 55.21% | 621.2 nsec |
| 50 KΩ | 7.5 V | 150 μA | 55.92% | 621.4 nsec |
| 55 KΩ | 7.7 V | 140 μA | 56.39% | 625.4 nsec |
| 60 KΩ | 7.87 V | 131 μA | 56.71% | 625.3 nsec |
| 65 KΩ | 8.02 V | 123 μA | 56.83% | 625.5 nsec |
| 70 KΩ | 8.15 V | 116 μA | 56.81% | 625.9 nsec |
| 75 KΩ | 8.27 V | 110 μA | 56.67% | 630.1 nsec |
| 80 KΩ | 8.4 V | 105 μA | 56.15% | 630.6 nsec |

| 10 stages-charge pump | | | | |
|---|---|---|---|---|
| $R_L$ | $V_{out}$ (max) | $I_{out}$ (max) | η | $t_{rise}$ |
| 45 KΩ | 8.3 V | 184 μA | 55.01% | 904.4 nsec |
| 50 KΩ | 8.6 V | 172 μA | 56.30% | 903.7 nsec |
| 55 KΩ | 8.87 V | 161 μA | 57.40% | 901.4 nsec |
| 60 KΩ | 9.1 V | 151 μA | 58.19% | 906.2 nsec |
| 65 KΩ | 9.3 V | 143 μA | 58.78% | 910.9 nsec |
| 70 KΩ | 9.48 V | 135 μA | 59.20% | 911.3 nsec |
| 75 KΩ | 9.64 V | 128 μA | 59.49% | 916 nsec |
| 80 KΩ | 9.79 V | 122 μA | 59.68% | 920.7 nsec |
| 85 KΩ | 9.92 V | 116 μA | 59.77% | 921 nsec |
| 90 KΩ | 10.05 V | 112 μA | 59.77% | 925.9 nsec |
| 95 KΩ | 10.15 V | 107 μA | 59.72% | 930.5 nsec |
| 100 KΩ | 10.20 V | 102 μA | 59.62% | 930.7 nsec |

Figure 6E:
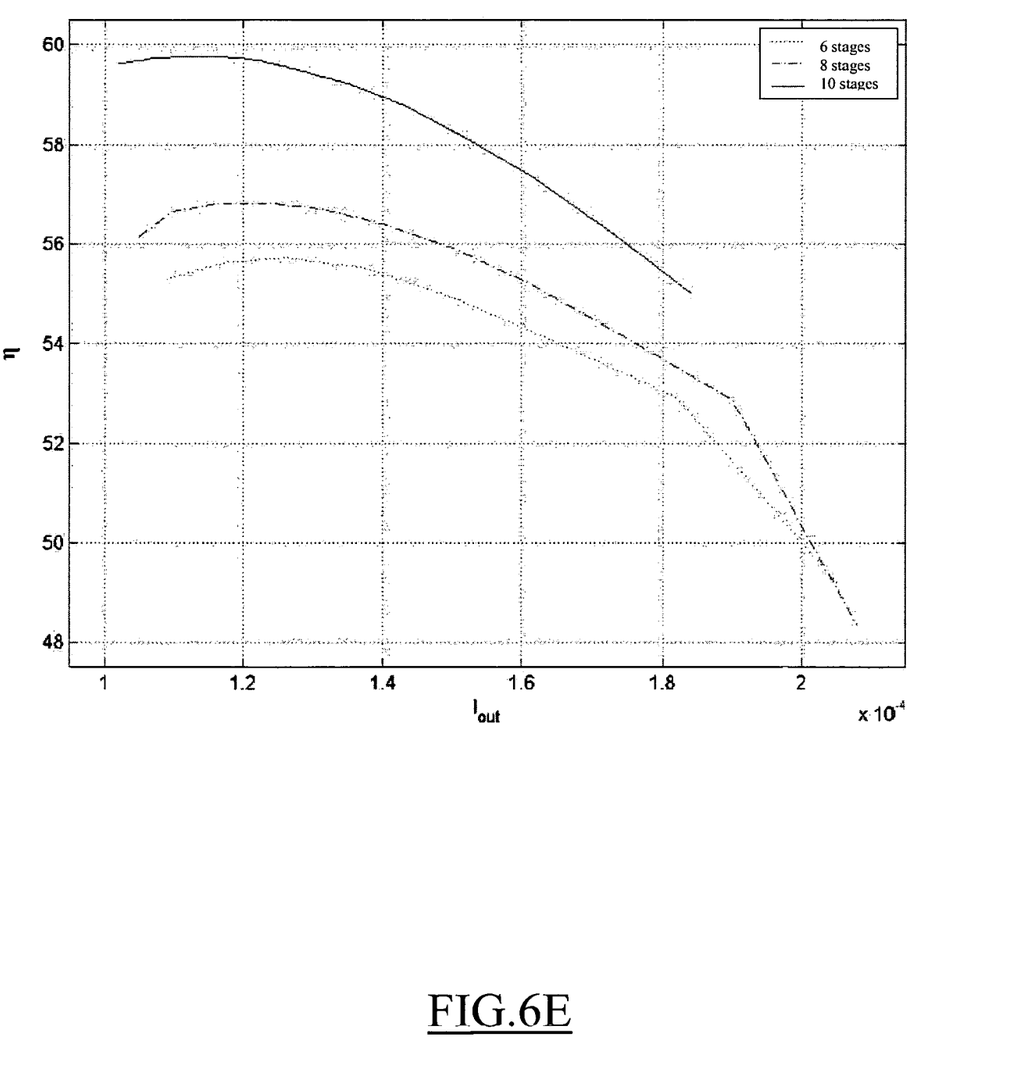

For the purpose of evaluating the effects on the energetic efficiency η of the number of booster stages, FIG. 6E shows the comparison among the energetic efficiencies η of the proposed charge pump implemented with six, eight and ten booster stages.

By inspecting FIG. 6E, it is possible to assert that the qualitative trend of the energetic efficiency η depending on the output current $I_{out}$ is similar in all the three cases taken in exam (i.e., with six, eight or ten booster stages). Moreover, for the same output current $I_{out}$, the energetic efficiency η increases with the number of boosting stages. This latest feature is due to the increased output voltages $V_{out}$, the decreased ripple voltages, and the stronger reuse of the electric charge.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A two-phase charge pump capable of being controlled by a first clock signal having a first phase and a second clock signal having a second phase, the first and second clock signals being out-of-phase and taking alternatively a first value and a second value during consecutive phases, the charge pump comprising:
   a sequence of cascade-connected stages that each have a first section and a second section, each of the first and second sections including:
      an input terminal and an output terminal, the input terminal of each of the stages other than the first stage of the sequence being cross-coupled with the output terminal of a preceding stage;
      a capacitive element having a first terminal and a second terminal, the second terminal being coupled with the output terminal of the section, the first terminal in each of the first sections receiving the first clock signal, the first terminal in each of the second sections receiving the second clock signal; and
      a controlled switch coupling the input terminal of the section with the output terminal of the section, the controlled switch having a control terminal,
   wherein in each of the stages, the control terminal of the controlled switch of the first section is directly connected to the control terminal of the controlled switch of the second section,
   each of the first sections further includes a first control circuit coupling the control terminal with the output terminal of the first section during the first phase, and
   each of the second sections further includes a second control circuit coupling the control terminal with the input terminal of the second section during the second phase.

2. The charge pump according to claim 1,
   wherein in each of the first sections, the first control circuit includes a first additional controlled switch having a control terminal coupled to the input terminal of the first section, and
   in each of the second sections, the second control circuit includes a second additional controlled switch having a control terminal coupled to the output terminal of the second section.

3. The charge pump according to claim 2, further comprising:
   a global output terminal; and
   an output stage cascade-connected to a last stage of the sequence; and
   wherein the output stage includes a first output controlled switch coupling the output terminal of the first section in the last stage with the global output terminal,
   the output stage further includes a second output controlled switch coupling the output terminal of the second section in the last stage with the global output terminal,
   the first output controlled switch has a control terminal coupled with the output terminal of the second section in the last stage, and
   the second output controlled switch has a control terminal coupled with the output terminal of the first section in the last stage.

4. The charge pump according to claim 3, wherein in each of the first and second sections, the controlled switch consists of a pass transistor that is connected between the input terminal of the section and the output terminal of the section.

5. A two-phase charge pump capable of being controlled by a first clock signal having a first phase and a second clock signal having a second phase, the first and second clock signals being out-of-phase and taking alternatively a first value and a second value during consecutive phases, the charge pump comprising:
   a sequence of cascade-connected stages that each have a first section and a second section, each of the first and second sections including:
      an input terminal and an output terminal, the input terminal of each of the stages other than the first stage of the sequence being cross-coupled with the output terminal of a preceding stage;
      a capacitive element having a first terminal and a second terminal, the second terminal being coupled with the output terminal of the section; the first terminal in each of the first sections receiving the first clock signal, the first terminal in each of the second sections receiving the second clock signal; and
      a controlled switch coupling the input terminal of the section with the output terminal of the section, the controlled switch having a control terminal,
   wherein in each of the stages, the control terminals are coupled to each other,
   each of the first sections further includes a first control circuit coupling the control terminal with the output terminal of the first section during the first phase,
   each of the second sections further includes a second control circuit coupling the control terminal with the input terminal of the second section during the second phase,
   in each of the first and second sections, the controlled switch consists of a pass transistor that is connected between the input terminal of the section and the output terminal of the section, and
   the pass transistor of each of the first sections is of a first type, and the pass transistor of each of the second sections is of a second type, which is opposite of the first type.

6. The charge pump according to claim 2,
   wherein in each of the first sections, the first additional controlled switch consists of a first control transistor connected between the control terminal and the output terminal of the first section, and
   in each of the second sections, the second additional controlled switch consists of a second control transistor connected between the control terminal and the input terminal of the second section.

7. The charge pump according to claim 6,
   wherein in each of the first sections, the first control transistor is of the first type, and
   in each of the second sections, the second control transistor is of the second type.

8. The charge pump according to claim 3,
   wherein the first output controlled switch consists of a first output transistor connected between the output terminal of the first section in the last stage and the global output terminal, and
   the second output controlled switch consists of a second output transistor connected between the output terminal of the second section in the last stage and the global output terminal.

9. The charge pump according to claim 8, wherein the first output transistor is of the first type and the second output transistor is of the second type.

10. The charge pump according to claim 5, wherein each transistor of the first type is a PMOS transistor, and each transistor of the second type is an NMOS transistor.

11. An integrated circuit including at least one two-phase charge pump capable of being controlled by a first clock signal and a second clock signal that are out-of-phase and take alternatively a first value and a second value, the charge pump comprising:
a sequence of cascade-connected stages that each have a first section and a second section, each of the first and second sections including:
an input terminal and an output terminal, the input terminal of each of the stages other than the first stage of the sequence being cross-coupled with the output terminal of a preceding stage;
a capacitive element having a first terminal and a second terminal, the second terminal being coupled with the output terminal of the section, the first terminal in each of the first sections receiving the first clock signal, the first terminal in each of the second sections receiving the second clock signal; and
a controlled switch coupling the input terminal of the section with the output terminal of the section, the controlled switch having a control terminal,
wherein in each of the stages, the control terminal of the controlled switch of the first section is directly connected to the control terminal of the controlled switch of the second section,
each of the first sections further includes a first control circuit coupling the control terminal with the output terminal of the first section during the first phase, and
each of the second sections further includes a second control circuit coupling the control terminal with the input terminal of the second section during the second phase.

12. The integrated circuit according to claim 11,
wherein in each of the first sections of the charge pump, the first control circuit includes a first additional controlled switch having a control terminal connected to the input terminal of the first section, and
in each of the second sections of the charge pump, the second control circuit includes a second additional controlled switch having a control terminal coupled to the output terminal of the second section.

13. The integrated circuit according to claim 12, wherein the charge pump further comprises:
a global output terminal; and
an output stage cascade-connected to a last stage of the sequence; and
wherein the output stage includes a first output controlled switch coupling the output terminal of the first section in the last stage with the global output terminal,
the output stage further includes a second output controlled switch coupling the output terminal of the second section in the last stage with the global output terminal,
the first output controlled switch has a control terminal coupled with the output terminal of the second section in the last stage, and
the second output controlled switch has a control terminal coupled with the output terminal of the first section in the last stage.

14. The integrated circuit according to claim 13, wherein in each of the first and second sections of the charge pump, the controlled switch consists of a pass transistor that is connected between the input terminal of the section and the output terminal of the section.

15. An integrated circuit, including at least one two-phase charge pump capable of being controlled by a first clock signal and a second clock signal that are out-of-phase and take alternatively a first value and a second value, the charge pump comprising:
a sequence of cascade-connected stages that each have a first section and a second section, each of the first and second sections including:
an input terminal and an output terminal, the input terminal of each of the stages other than the first stage of the sequence being cross-coupled with the output terminal of a preceding stage;
a capacitive element having a first terminal and a second terminal, the second terminal being coupled with the output terminal of the section; the first terminal in each of the first sections receiving the first clock signal, the first terminal in each of the second sections receiving the second clock signal; and
a controlled switch coupling the input terminal of the section with the output terminal of the section, the controlled switch having a control terminal,
wherein in each of the stages, the control terminals are coupled to each other,
each of the first sections further includes a first control circuit coupling the control terminal with the output terminal of the first section during the first phase,
each of the second sections further includes a second control circuit coupling the control terminal with the input terminal of the second section during the second phase,
in each of the first and second sections of the charge pump, the controlled switch consists of a pass transistor that is connected between the input terminal of the section and the output terminal of the section, and
the pass transistor of each of the first sections of the charge pump is of a first type, and the pass transistor of each of the second sections of the charge pump is of a second type, which is opposite of the first type.

16. The integrated circuit according to claim 12,
wherein in each of the first sections of the charge pump, the first additional controlled switch consists of a first control transistor having a first terminal connected to the control terminal of the controlled switch of the first section and a second terminal connected to the output terminal of the first section, and
in each of the second sections of the charge pump, the second additional controlled switch consists of a second control transistor connected between the control terminal and the input terminal of the second section.

17. The integrated circuit according to claim 16,
wherein in each of the first sections of the charge pump, the first control transistor is of the first type, and
in each of the second sections of the charge pump, the second control transistor is of the second type.

18. The integrated circuit according to claim 13,
wherein the first output controlled switch of the charge pump consists of a first output transistor connected between the output terminal of the first section in the last stage and the global output terminal, and
the second output controlled switch of the charge pump consists of a second output transistor connected between the output terminal of the second section in the last stage and the global output terminal.

19. The integrated circuit according to claim 15, wherein in the charge pump, each transistor of the first type is a PMOS transistor, and each transistor of the second type is an NMOS transistor.

20. The charge pump according to claim 1, wherein in each of the first sections, the first control circuit includes a first control transistor having a first terminal connected to the control terminal of the controlled switch of the first section, a second terminal connected to the output terminal of the first section, and a control terminal connected to the input terminal of the first section.

* * * * *